United States Patent
Maro (10) Patent No.: US 9,964,124 B2
(45) Date of Patent: May 8, 2018

(54) PISTON ACCUMULATOR WITH INTEGRATED CYLINDER ROD

(71) Applicant: Deere & Company, Moline, IL (US)

(72) Inventor: Randall A. Maro, Davenport, IA (US)

(73) Assignee: Deere & Company, Moline, IL (US)

(*) Notice: Subject to any disclaimer, the term of this patent is extended or adjusted under 35 U.S.C. 154(b) by 288 days.

(21) Appl. No.: 14/843,293

(22) Filed: Sep. 2, 2015

(65) Prior Publication Data

US 2017/0058918 A1    Mar. 2, 2017

(51) Int. Cl.
   *F15B 1/24* (2006.01)
   *A01C 7/20* (2006.01)
   *F15B 15/14* (2006.01)
   *A01C 5/06* (2006.01)

(52) U.S. Cl.
   CPC ............ *F15B 1/24* (2013.01); *A01C 7/205* (2013.01); *F15B 15/14* (2013.01); *A01C 5/064* (2013.01); *F15B 2201/31* (2013.01)

(58) Field of Classification Search
   CPC ...... F15B 1/24; F15B 1/00; F15B 1/02; F15B 1/021; F15B 15/14; A01C 7/205; A01C 5/064; B60G 17/0424; B60G 17/04
   USPC ............. 267/120, 64.25, 64.26; 60/413, 418
   See application file for complete search history.

(56) References Cited

U.S. PATENT DOCUMENTS

| | | | | |
|---|---|---|---|---|
| 2,546,648 A * | 3/1951 | Mercier | ................... | F15B 1/20 138/30 |
| 3,353,352 A * | 11/1967 | Gardner | ................. | F15B 1/024 60/406 |
| 3,677,142 A * | 7/1972 | Roth | ................... | A01D 34/246 92/60 |
| 3,869,861 A * | 3/1975 | Case | .................... | A01D 41/145 267/64.11 |
| 4,074,858 A * | 2/1978 | Burns | ..................... | B05B 12/06 111/127 |
| 4,859,006 A * | 8/1989 | Philippe | ............... | B62D 55/305 267/64.13 |
| 5,024,465 A * | 6/1991 | Baiker | ..................... | B60G 9/04 267/64.13 |
| 5,234,060 A * | 8/1993 | Carter | .................... | A01B 63/22 172/260.5 |
| 5,647,580 A * | 7/1997 | Buma | .................. | B60G 17/044 267/64.17 |
| 5,984,059 A * | 11/1999 | Kurachi | ............... | B60G 21/073 188/314 |

(Continued)

FOREIGN PATENT DOCUMENTS

CN    102041981 A    5/2011
CN    201615406 U    8/2011

(Continued)

OTHER PUBLICATIONS

EP Extended Search Report Application No. 16186798.1, dated Aug. 2, 2017, 7 pages.

*Primary Examiner* — Jamie L McGowan
(74) *Attorney, Agent, or Firm* — Joseph R. Kelly; Kelly, Holt & Christenson, PLLC (57) ABSTRACT

A cylinder rod is disposed within a cylinder that defines a cylinder volume. An accumulator defines an accumulator volume that is disposed generally annularly about the cylinder rod. The accumulator volume is separated from the cylinder volume by an accumulator piston.

18 Claims, 5 Drawing Sheets

(56) References Cited

U.S. PATENT DOCUMENTS

| | | | | |
|---|---|---|---|---|
| 5,988,607 A * | 11/1999 | Beck | | B60G 17/0424 267/218 |
| 6,263,556 B1 * | 7/2001 | Stephan | | F16F 9/526 267/64.14 |
| 6,511,085 B2 * | 1/2003 | Sawai | | B60G 17/0416 267/186 |
| 6,871,845 B2 * | 3/2005 | Beck | | F16F 9/08 267/64.17 |
| 6,923,215 B2 * | 8/2005 | Weber | | F15B 1/24 138/31 |
| 7,104,052 B1 * | 9/2006 | Hindman | | A01D 34/246 60/413 |
| 7,431,134 B2 * | 10/2008 | Ansel | | F16F 9/0209 188/269 |
| 9,232,687 B2 * | 1/2016 | Bassett | | A01B 61/044 |
| 2003/0077183 A1 * | 4/2003 | Franchet | | F15B 7/006 417/269 |
| 2005/0098326 A1 * | 5/2005 | Tosen | | E02F 9/2207 172/2 |
| 2008/0308168 A1 * | 12/2008 | O'Brien, II | | B60K 6/12 138/31 |
| 2014/0230645 A1 * | 8/2014 | Bauer | | F16F 9/365 92/109 |
| 2015/0027683 A1 * | 1/2015 | Hisanaga | | G05D 23/023 165/297 |
| 2015/0176613 A1 * | 6/2015 | Schmidt | | F16H 43/00 91/183 |
| 2015/0208571 A1 | 7/2015 | Hahn et al. | | |

FOREIGN PATENT DOCUMENTS

| | | |
|---|---|---|
| DE | 102011121777 A1 | 6/2013 |
| EP | 1703142 A1 | 9/2006 |
| EP | 2554036 A1 | 2/2013 |
| FR | 2823803 A1 | 10/2002 |
| FR | 2894313 A1 | 6/2007 |
| JP | S62121402 U | 8/1987 |

* cited by examiner

PISTON ACCUMULATOR WITH INTEGRATED CYLINDER ROD

FIELD OF THE DESCRIPTION

The present description relates to a piston accumulator. More specifically, the present description relates to a piston accumulator that is integrated with a cylinder rod assembly.

BACKGROUND

An accumulator allows a hydraulic cylinder rod to move without changing the volume of oil in the cylinder. The accumulator has an accumulator volume that is separated from the hydraulic cylinder volume. When the cylinder rod moves, without changing the amount of oil in the cylinder, a movable element moves to compress the accumulator volume and thus absorb and release energy. This tends to even out a force profile exerted by the hydraulic cylinder rod.

There are a wide variety of different applications for an accumulator. For instance, on mobile machines, a piston accumulator can be used in a cab suspension cylinder. It can also be used in a seat suspension cylinder or in a wide variety of other applications.

In one example, accumulators can be used in agricultural equipment in order to even out a downforce that is applied by the equipment on the ground that it is treating. For instance, row units on a planter follow the ground profile by using a combination of gauge wheels (to keep the row unit from sinking into the ground) and a downforce assembly that includes springs (which can be either mechanical, pneumatic, or a combination of the two) to push disk openers into the ground. Currently, downforce assemblies provide a relatively fixed downforce, which may or may not be adjustable, while planting. Because there is no dampening in the downforce assembly, row units that are moving over soil while planting tend to bounce after hitting a hard patch of soil. This can result in incorrect seed placement. The seeds can be at an incorrect depth, or the seeds can even be dropped on the surface of the ground, because the row units can bounce completely out of the ground.

In some systems, an operator can address this by increasing the downforce on the row unit. However, depending upon the different types of soil conditions, this can actually be detrimental. For example, if the downforce is too high, the gauge wheels can compress the sides of the furrow too much so that the sidewalls are too hard. Also, the seed depth can be too great.

Adding hardware to a row unit also presents some challenges. Row units can have a relatively large number of hardware components. Thus, packaging additional hardware components on an already crowded row unit, can be become difficult.

The discussion above is merely provided for general background information and is not intended to be used as an aid in determining the scope of the claimed subject matter.

SUMMARY

A cylinder rod is disposed within a cylinder that defines a cylinder volume. An accumulator defines an accumulator volume that is disposed generally annularly about the cylinder rod. The accumulator volume is separated from the cylinder volume by an accumulator piston.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
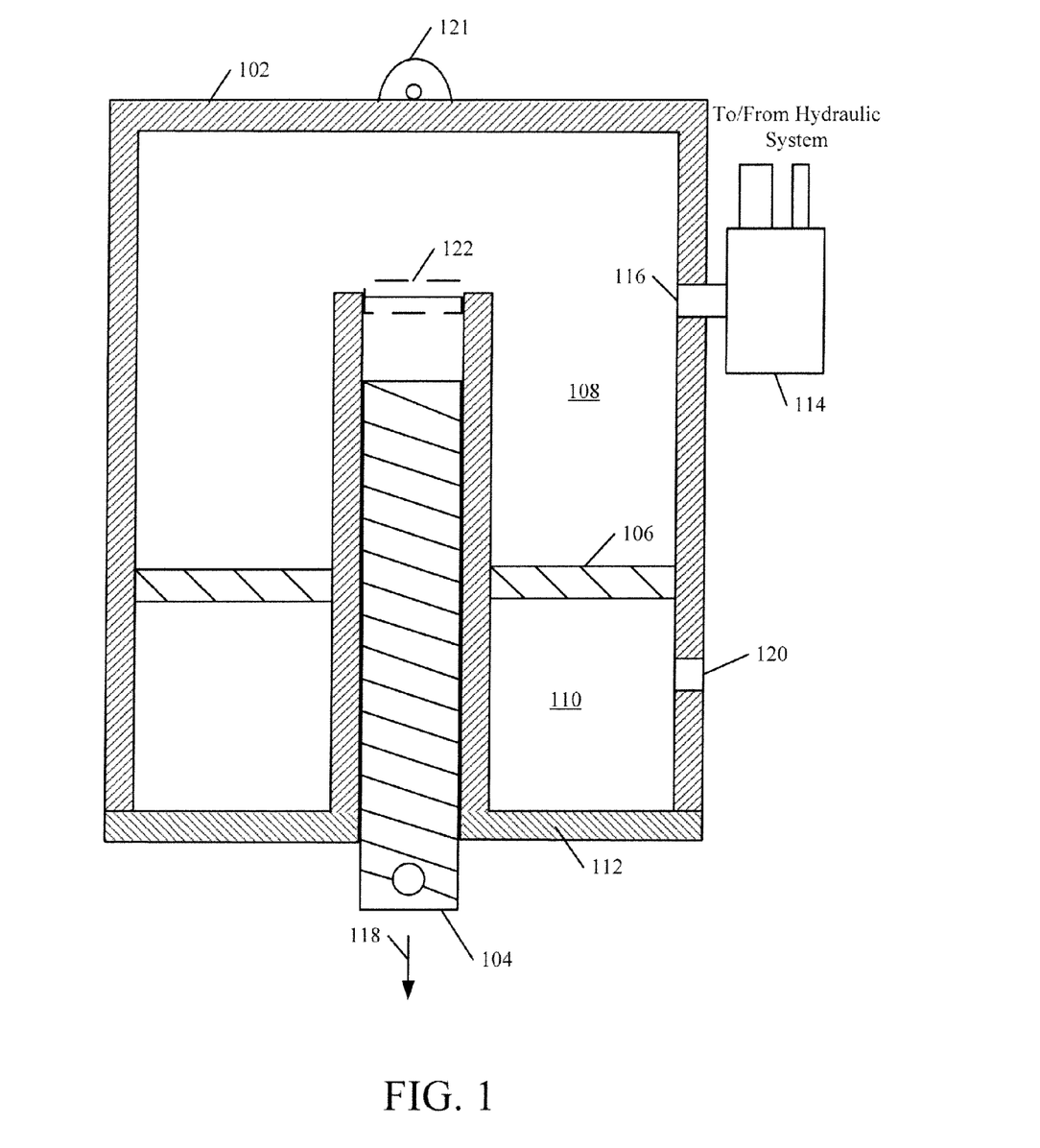
FIG. 1 is a cross sectional view of one example of a piston accumulator.

FIG. 1 is a cross sectional view of one example of a hydraulic actuator 100. Actuator 100 illustratively includes a cylinder (or cylinder housing) 102 with a piston (or rod) 104. Actuator 100 also illustratively includes an accumulator piston 106 that divides the volume within cylinder 102 into a hydraulic cylinder volume 108 and an accumulator volume 110. In the example shown in FIG. 1, guide 112 serves as both a rod guide for rod 104 and a piston guide for accumulator piston 106. It can thus be seen that accumulator volume 110 is, in one example, generally annularly disposed about both guide 112 and rod 104.

Figure 4:
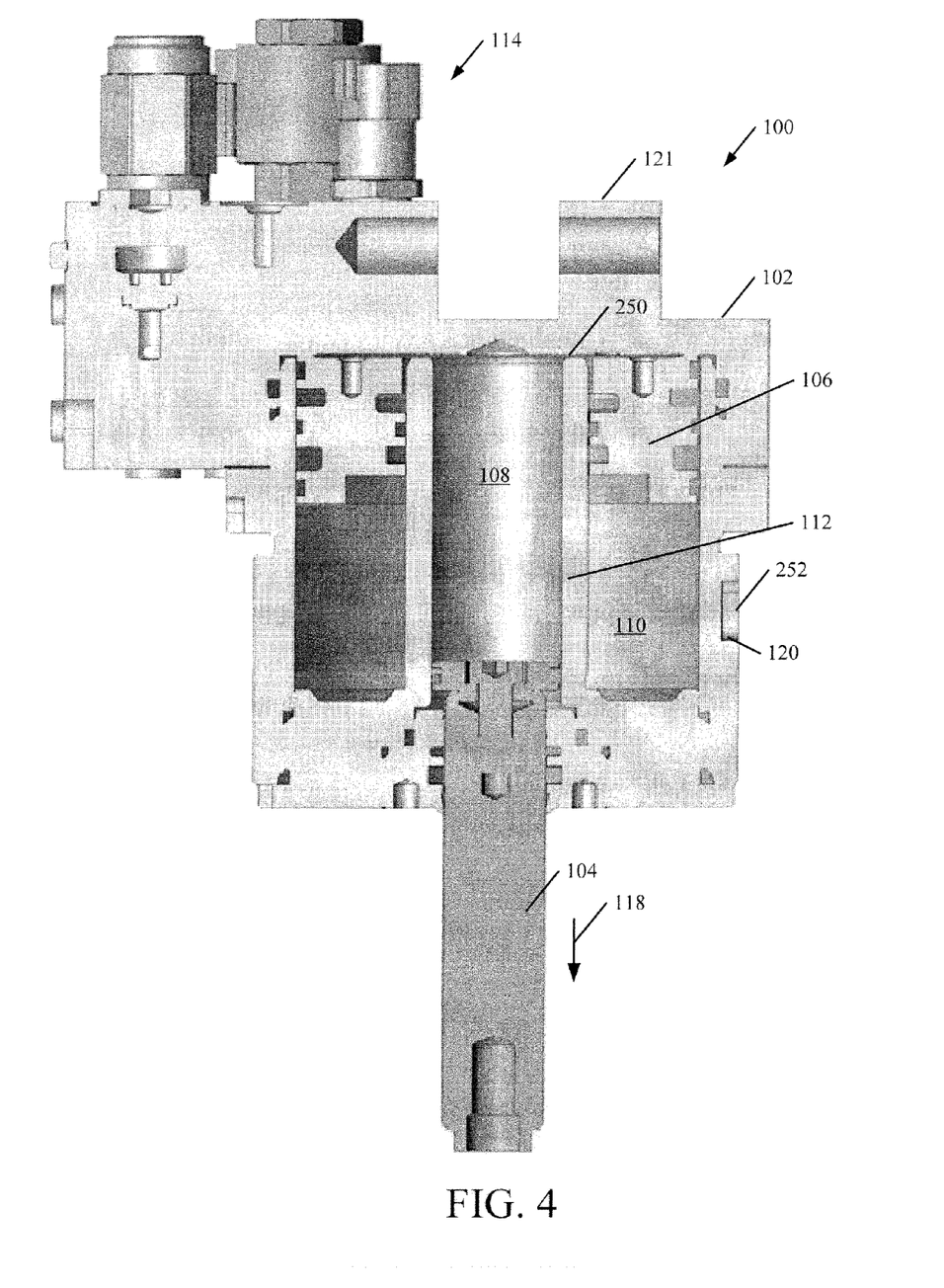
FIG. 4 is a more detailed illustration of one example of a piston accumulator integrated with a cylinder rod.

In the example shown in FIG. 1, actuator 100 is also provided with a hydraulic valve 114 that is coupled to a hydraulic system (shown in FIG. 4). Thus, valve 114 is illustratively controllable to provide hydraulic fluid under pressure from the hydraulic system, through port 116, to volume 108. This increases fluid pressure in volume 108 and can thus cause rod 104 to extend in the direction generally indicated by arrow 118. Valve 114 is also controllable to allow fluid to flow from volume 108 to a tank of the hydraulic system. This can allow rod 104 to move in a direction generally opposite that of arrow 118.

FIG. 1 also shows that, in one example, accumulator volume 110 can be accessed through accumulator port 120, which may have an accumulator valve (or precharge valve) disposed therein. Thus, volume 110 can be pre-charged with a desired amount of gas (or other compressible medium, that is more compressible than the hydraulic oil or other medium in cylinder volume 108) to fill accumulator volume 110 to a desired pressure. Piston 106 can illustratively move up and down along guide 112 between two extreme positions. One extreme position can define a maximum accumulator volume, while the other extreme position can define a minimum accumulator volume. The pre-change pressure can be a pre-defined pressure at maximum volume, at minimum volume, or both.

Also, in some examples, actuator 100 can be provided with a set of dampening components 122. Dampening components 122 can include one or more orifices, one or more one way orifices, relief valves, or other components.

Actuator 100 illustratively includes one or more mounting brackets 121. Actuator 100 is illustratively coupled to a frame of a machine that carries it with bracket 121.

In operation, accumulator volume 110 can be pre-charged to the desired pre-charge pressure, or to a desired volume, through the pre-charge valve that resides in charge port 120. The amount of force applied on rod 104 in the direction indicated by arrow 118 is then controlled by introducing hydraulic fluid under pressure, through valve 114 and port 116, into volume 108. This will increase the pressure in volume 108 to simultaneously exert pressure on rod 104 and on accumulator piston 106. Rod 104 will illustratively move in the direction indicated by arrow 118 (or at least apply force in that direction) while piston 106 compresses the gas in volume 110. The amount of force being exerted by rod 104 on a work piece or another item that it is acting on, can be sensed, and when a desired force is reached, then the hydraulic fluid under pressure can simply be maintained at that pressure in volume 108, such as by closing valve 114.

It may be, however, that rod 104 experiences a disturbance (or an applied force) in a direction opposite arrow 118. By way of example, in an implementation (which will be described in greater detail below) where rod 104 is being used to apply down force to a row unit on a planter, the row unit may hit a patch of dry ground. This may result in an upwardly directed force (in the direction opposite arrow 118) being applied to rod 104. This will cause rod 104 to move upwardly (in the direction opposite arrow 118). Meanwhile, the amount of hydraulic fluid in volume 108 remains constant. Thus, movement of rod 104 into volume 108, in turn, causes piston 106 to compress the gas in volume 110 and thus store energy. When the disturbance is removed from rod 104, the gas in volume 110 will again expand causing piston 106 to move upwardly in the depiction illustrated in FIG. 1, thus releasing the stored energy. This interaction tends to even out the force profile of the force exerted by rod 104.

It may be desired that, in order to keep the force profile relatively flat, the ratio of volume 110 to volume 108 may be relatively large. However, because row units have relatively restricted space, this can be difficult. It can be seen in FIG. 1, however, that the geometry of disposing accumulator volume 110 generally concentrically about rod 104 allows for the ratio of accumulator volume 110 to cylinder volume 108 to be relatively large. Because of the relationship between a change in the outer diameter of cylinder 102 and a corresponding change in the size of volume 110, a relatively small change in the outer diameter of cylinder 102 yields a relatively large change in volume 110. Thus, the geometry illustrated in FIG. 1 allows the accumulator volume 110 to be increased, by a large amount, in comparison to any corresponding increase in the size of actuator 100.

It will also be noted that the operation of actuator 100 can be tuned in a number of different ways. For instance, valves integrated as dampening components 122 can dampen the operation of accumulator piston 106. This can increase the linearity of the accumulator response. For instance, at high pressures in cylinder volume 108, the resolution of the accumulator response of piston 106 tends to decrease. Therefore, in one example, dampening components 122 include a pressure-responsive valve. At higher pressures in volume 108, the valve restricts the flow of fluids across dampening components 122. This tends to dampen the response of accumulator 106 more, at higher cylinder pressures in volume 108. A wide variety of other dampening components 122 can be used in order to tune the accumulator response as well.

Further, the movement of piston 106 may be limited by a positive stop (or a set of positive stops) disposed on the inner surface of cylinder 102, or on the outer surface of guide 112, or both. These define the extreme positions of the piston 106 and thus define the maximum and minimum accumulator volumes. The placement of such positive stops can thus be used to tune the response of accumulator piston 106 as well.

Further, the gas pre-charge in volume 110 can be used to tune the accumulator response. It may be assumed, in one example, that piston 106 is movable between two extremes so that volume 110 varies between the maximum volume and the minimum volume. By setting the gas pre-charge value in volume 110 to be a given pressure at the maximum or minimum volumes, or both, this can change the response of the accumulator as well.

In addition, the control mechanism for controlling valve 114 can be used to tune the accumulator response as well. Assume, first, that it is desired that the accumulator response be linear with respect to movement of rod 104. That is, for every change in the position of rod 104, there is a change in the position of piston 106, and the relationship between the two change values varies linearly over the operational pressures in hydraulic cylinder volume 108. Assume further that its operation is linear over a given percent of its operational pressure range. Then, in the non-linear areas, the control system used to control valve 114 can make adjustments to the hydraulic fluid pressure within volume 108, in order to further linearize the accumulator response and ultimately the force profile of the actuator. These, of course, are only examples of how the response of the accumulator can be tuned with respect to the example shown in FIG. 1.

Figure 2:
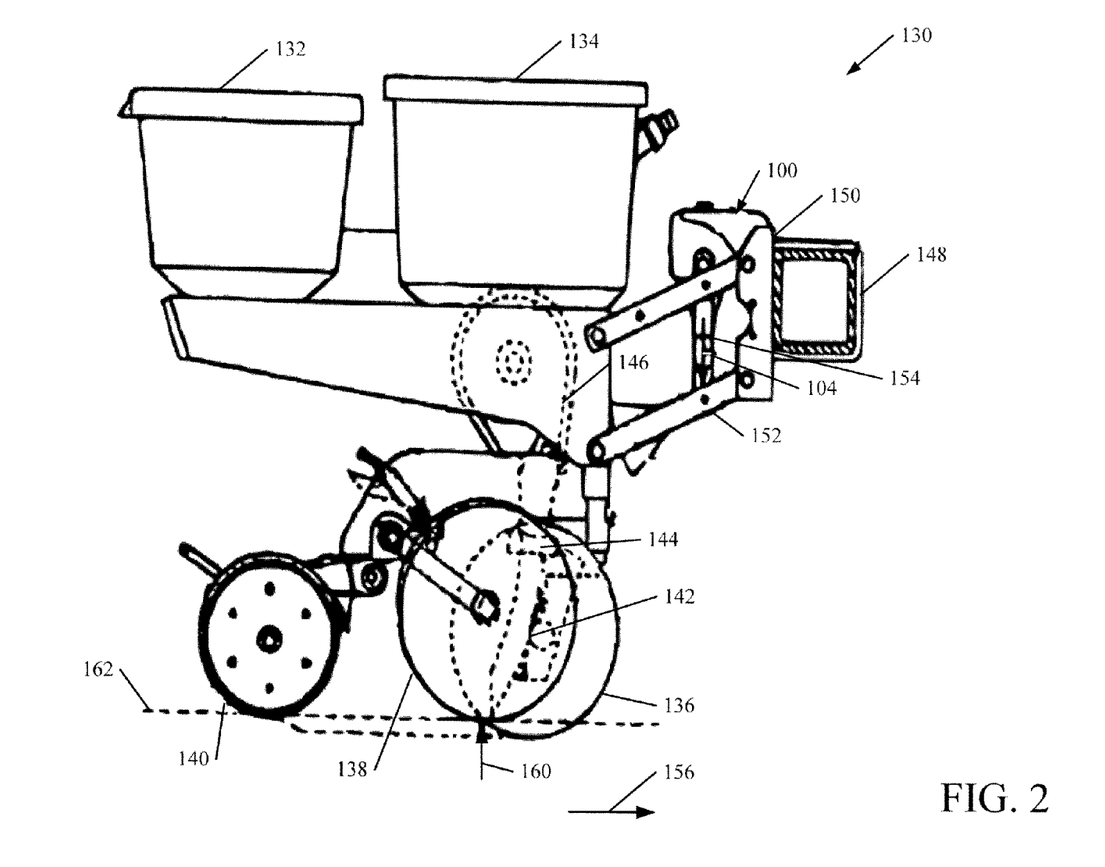
FIG. 2 is a pictorial illustration of one example of a row unit, with the piston accumulator (illustrated in FIG. 1) disposed thereon.

FIG. 2 shows one example of an application of actuator 100. FIG. 2 shows a row unit 130 on an agricultural planter. Row unit 130 is illustratively fastened to other row units by tool bar 148. The set of row units is illustratively towed behind a mobile machine, such as a tractor.

Row unit 130 illustratively includes a fertilizer tank 132 and a seed storage tank 134. It also illustratively includes a disk opener 136, a set of gauge wheels 138, and a set of closing wheels 140. Seeds are illustratively dropped through a seed tube 142, from seed storage tank 134. The seeds can be sensed by a seed sensor 144 and the rate at which seeds are dropped can be controlled using seed meter 146. Actuator 100 is mounted on a coupling assembly 150 that couples row unit 130 to toolbar 148. Rod 104 is coupled to a parallel linkage 152 and is used to exert down force (in the direction indicated by arrow 154) on row unit 130. The downforce is offset by the upwardly directed forces acting on closing wheels 140 (from ground 162) and double disk opener 136 (again from ground 162). The remaining force (the force vector indicated by arrow 154 minus the sum of the force vectors exerted on double disk opener 136 and closing wheels 140), is the differential force, and this force acts on gauge wheels 138. This load is sensed by a gauge wheel load sensor (shown in FIG. 4).

As row unit 130 travels generally in the direction indicated by arrow 156, the double disk opener 136 opens a furrow in the soil, seeds are dropped through seed tube 142, and closing wheels 140 close the soil. Gauge wheels 138 control the depth of the furrow and also act to firm the ground on the sides of the furrow so they do not collapse and re-fill the furrow before a seed is dropped into the furrow. Gauge wheel 138 can include the gauge wheel load sensor that senses the load exerted (generally indicated by arrow 160) on the gauge wheels. In one example, it may be desirable to keep gauge wheels 160 in constant contact with the ground 162 over which row unit 130 is traveling, but not to exert too much pressure so that they undesirably compact or otherwise affect the soil.

However, when double disk opener 136 hits a hard patch of ground (for instance), it may move upward. This can impart an upwardly-directed force on rod 104, as discussed above with respect to FIG. 1. Upward movement of rod 104 acts to momentarily increase the pressure in volume 108. In that case, accumulator piston 106 (shown in FIG. 1) will compress the accumulator volume 110 to absorb (or store) the energy imparted by that force. When the force on rod 104 is removed, piston 106 releases the stored energy. This tends to smooth out the force profile of the downforce exerted by actuator 100 (and rod 104) in the direction indicated by arrow 154.

Figure 3:
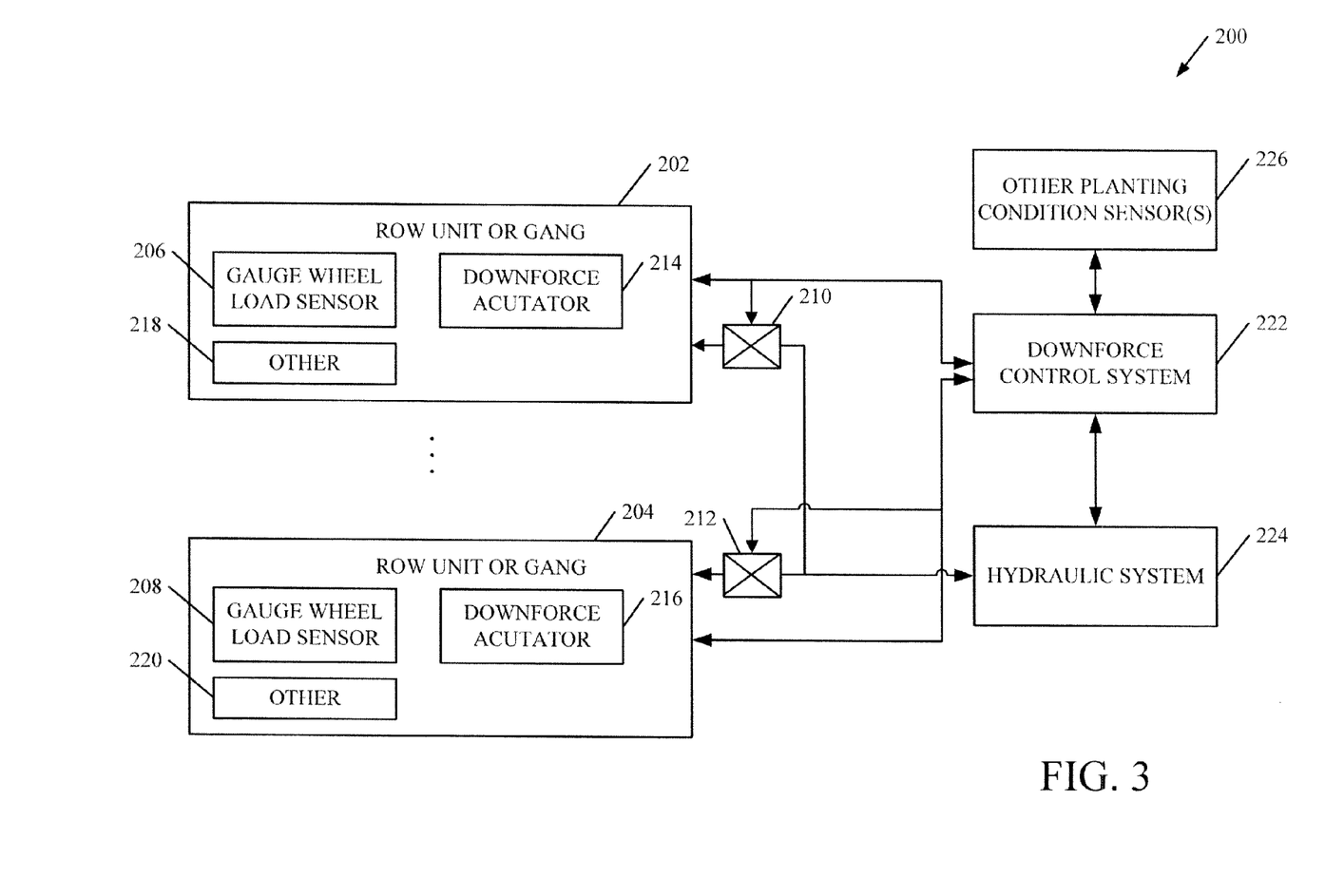
FIG. 3 is a block diagram of one example of a downforce control system architecture.

FIG. 3 is a block diagram illustrating one example of a control system architecture 200 that can be used to control hydraulic valves 114 (shown in FIG. 1) in order to control the down force exerted by actuator 100 (or a set of actuators 100) on either individual row units or on gangs of row units, where a plurality of row units are ganged together. Architecture 200 thus includes a set of row units 202-204. It will be appreciated that each row unit 202-204 can actually be a gang of row units, all of which have a single actuator (or a set of actuators acting in common) to exert a downforce on the gang of row units. However, for the sake of the present discussion, each item 202-204 will be described as a single row unit, although this is only one example.

Each row unit 202-204 includes (as discussed above with respect to FIG. 2) a gauge wheel load sensor 206-208, a downforce control valve 210-212, a downforce actuator 214-216, and it can include other items 218-220 (such as those shown in FIG. 2). Downforce actuators 214-216 are each, in one example, an actuator 100 shown in FIG. 1.

Control valves 210-212 are each illustratively a valve 114 (shown in FIG. 1). Thus they are controlled by downforce control system 222 so that they controllably provide fluid under pressure from hydraulic system 224 to the corresponding actuators 214-216, and allow hydraulic fluid to flow back to the tank of hydraulic system 224 from actuators 214-216.

Architecture 200 is also shown with a set of other planting condition sensors 226. Other planting condition sensors 226 can sense a wide variety of conditions. For instance, they can sense soil moisture, soil compaction, the location or speed of the machine that is pulling the row units, or a wide variety of other sensors. Control system 222 can receive sensor signals from gauge wheel load sensors 206-208 and sensors 226 and use those signals to control valves 210-212 to control the downforce applied by downforce actuators 214-216.

It should be noted that downforce control system 222 can operate according to a wide variety of different control algorithms. For instance, it can operate in a very precise, high resolution manner, that accomplishes millisecond (or better) control of valves 210-212, in order to control the force profile exerted by actuators 214-216. In other applications, it can operate with less resolution.

FIG. 4 is a pictorial illustration (in section) of another example of actuator 100. Some items are similar to those shown in FIG. 1, and they are similarly numbered. It can be seen in FIG. 4 that volume 108 is formed of the volume within guide 112, that guides rod 104. Piston 106 is annularly disposed about guide 112, and volume 108 ports over to the upper surface of piston 106 through space 250 at the top of guide 112. The accumulator volume 110 is illustratively charged through a pre-charge valve 252 in port 120. It will be noted, of course, that the illustration shown in FIG. 4 is only one example.

It can thus be seen that the present actuator geometry provides a relatively large accumulator volume, relative to the hydraulic actuator volume. By even slightly increasing the diameter of cylinder 102, the accumulator volume 110 can be greatly increased. This allows the accumulator volume to be increased with relatively small increases in the outer diameter of actuator 100. This also enables the force profile of rod 104 to be relatively stable, or constant, without taking up a great deal of real estate on the implement to which it is attached (such as on a row unit or gang of row units).

It will also be noted that actuator 100 can be provided in a variety of other applications. For instance, it can be provided on a cab suspension assembly where it provides suspension of a cab on a mobile machine. It can be provided on a seat suspension assembly or in a wide variety of other applications.

It should also be noted that, in one example, the hydraulic actuator is a single acting actuator. Thus, instead of providing hydraulic fluid under pressure to both extend and retract rod 104, the hydraulic fluid pressure only acts in one direction.

Similarly, it will be noted that the placement of the accumulator volume 110 can be changed as well. Instead of being concentrically arranged around guide 112 (and rod 104) it can be arranged within piston rod 104. In such an example, the accumulator volume 110 may not be as great as in the example where it is disposed annularly outside of rod 104, but it will also be within the enclosure of actuator 100 so that an external accumulator need not be provided. This still saves real estate on the row unit, while allowing a significant accumulator volume to be obtained.

The present discussion has mentioned controllers, processors or servers. In one example, the controllers, processors or servers include computer processors with associated memory and timing circuitry, not separately shown. They are functional parts of the systems or devices to which they belong and are activated by, and facilitate the functionality of the other components or items in those systems.

Figure 5:
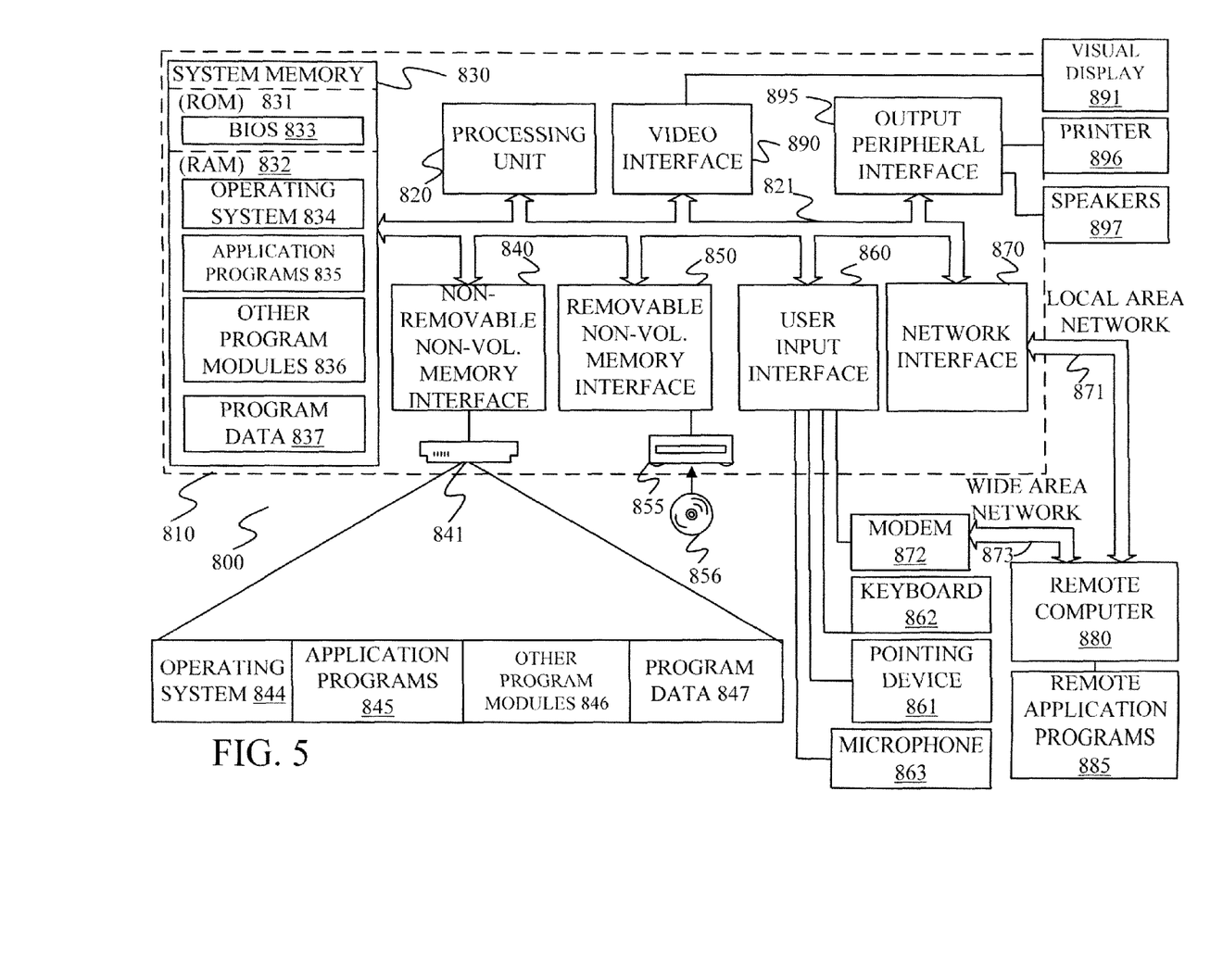
FIG. 5 is a block diagram of one example of a computing environment that can be used in the control system architecture shown in FIG. 3.

FIG. 5 is one example of a computing environment in which the downforce control system 222 of the architecture in FIG. 3, or parts of it, (for example) can be deployed. With reference to FIG. 5, an example system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include foot pedals, steering wheels, levers, buttons, a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an actuator, comprising:

a rod;

a cylinder housing defining a cylinder volume and an accumulator volume, the cylinder housing movably supporting the rod for movement outward relative to the cylinder housing in response to fluid under pressure being introduced into the cylinder volume; and an accumulator piston, movably supported within the cylinder housing and separating the cylinder volume from the accumulator volume in the cylinder housing.

Example 2 is the actuator of any or all previous examples wherein the cylinder housing defines the accumulator volume generally about an outer periphery of the rod.

Example 3 is the actuator of claim 2 wherein the cylinder housing comprises:

a guide that has an inner surface and an outer surface and supports the rod for movement along the inner surface.

Example 4 is the actuator of any or all previous examples wherein the guide supports the accumulator piston for movement along the outer surface of the guide.

Example 5 is the actuator of any or all previous examples wherein the cylinder housing defines the accumulator volume generally concentrically about the outer surface of the guide.

Example 6 is the actuator of any or all previous examples wherein the accumulator volume is charged with a compressible medium and wherein the accumulator piston moves to compress the compressible medium in the accumulator volume in response to movement of the rod into the cylinder housing with constant fluid under pressure in the cylinder volume.

Example 7 is the actuator of any or all previous examples and further comprising:

a dampening component mounted within the inner surface of the guide to dampen an accumulator response to movement of the rod inward relative to the cylinder housing with a constant cylinder volume.

Example 8 is the actuator of any or all previous examples wherein the actuator housing comprises a hydraulic actuator housing and wherein the fluid under pressure comprises hydraulic fluid.

Example 9 is an actuator, comprising:
a cylinder housing;
a guide disposed within the cylinder housing, an external surface of the guide and the cylinder housing defining a cylinder volume and an accumulator volume;
an accumulator piston, slidably disposed about the guide, within the cylinder housing and separating the cylinder volume from the accumulator volume; and
a rod, supported by an inner surface of the guide, for movement inward and outward relative to the cylinder housing in response to fluid under pressure being introduced into the cylinder volume.

Example 10 is the actuator of any or all previous examples wherein the accumulator piston is slidably mounted to reduce the accumulator volume when the rod moves inward relative to the cylinder housing with a constant cylinder volume.

Example 11 is the actuator of any or all previous examples wherein the accumulator volume is charged with a compressible medium and wherein the accumulator piston compresses the compressible medium as it reduces the accumulator volume.

Example 12 is the actuator of any or all previous examples and further comprising:
a dampening component mounted within the inner surface of the guide to dampen an accumulator response to movement of the rod inward relative to the cylinder housing with a constant cylinder volume.

Example 13 is the actuator of any or all previous examples wherein the dampening component comprises:
a restrictor that restricts flow of the fluid in the cylinder volume thereacross.

Example 14 is a row unit that performs an operation on a crop row, the row unit comprising:
a soil engaging element that engages soil to perform the operation;
a downforce actuator that applies a down force to the soil engaging element, the downforce actuator comprising:
a rod;
a cylinder housing defining a cylinder volume and an accumulator volume, the cylinder housing movably supporting the rod for movement outward relative to the cylinder housing in response to fluid under pressure being introduced into the cylinder volume; and
an accumulator piston, movably supported within the cylinder housing and separating the cylinder volume from the accumulator volume in the cylinder housing.

Example 15 is the row unit of any or all previous examples wherein the soil engaging element comprises:
an opener that generates a furrow in the soil to receive a seed;
a closer that closes the furrow; and
a set of gauge wheels that control a depth of the furrow and that firm sides of the furrow.

Example 16 is the row unit of any or all previous examples and further comprising:
a gauge wheel load sensor that senses a load on the set of gauge wheels and generates a sensor signal indicative of the sensed load, and wherein a control system receives the sensor signal and controls the fluid under pressure to the downforce actuator based on the sensor signal.

Example 17 is the row unit of any or all previous examples wherein the downforce actuator provides the downforce to a plurality of ganged row units.

Example 18 is the row unit of any or all previous examples wherein the cylinder housing comprises:
a guide that has an inner surface and an outer surface and supports the rod for movement along the inner surface, the guide supporting the accumulator piston for movement along the outer surface.

Example 19 is the row unit of any or all previous examples wherein the cylinder housing defines the accumulator volume generally concentrically about the outer surface of the guide, wherein the accumulator volume is charged with a compressible medium and wherein the accumulator piston moves to compress the compressible medium in the accumulator volume in response to movement of the rod into the cylinder housing with constant fluid under pressure in the cylinder volume.

Example 20 is the row unit of any or all previous examples wherein the downforce actuator further comprises:
a dampening component mounted within the inner surface of the guide to dampen an accumulator response to movement of the rod inward relative to the cylinder housing with a constant cylinder volume.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An actuator, comprising:
a rod;
a cylinder housing defining a cylinder volume and an accumulator volume, the cylinder housing movably supporting the rod;
a controllable hydraulic valve, controllable between an open position, in which hydraulic fluid passes through the hydraulic valve between the cylinder volume and a hydraulic system, and a closed position in which the hydraulic fluid is blocked from passing between the cylinder volume and the hydraulic system, wherein the rod is supported for movement outward relative to the cylinder housing in response to fluid under pressure being introduced into the cylinder volume through the hydraulic valve; and
an accumulator piston, movably supported within the cylinder housing and separating the cylinder volume from the accumulator volume in the cylinder housing, wherein the accumulator volume is charged with a compressible medium and wherein the accumulator piston moves to compress the compressible medium in the accumulator volume in response to movement of the rod into cylinder housing when the hydraulic valve is in the closed position so an amount of fluid under pressure in the cylinder volume is constant.

2. The actuator of claim 1 wherein the cylinder housing defines the accumulator volume generally about an outer periphery of the rod.

3. The actuator of claim 2 wherein the cylinder housing comprises:
a guide that has an inner surface and an outer surface and supports the rod for movement along the inner surface.

4. The actuator of claim 3 wherein the guide supports the accumulator piston for movement along the outer surface of the guide.

5. The actuator of claim 4 wherein the cylinder housing defines the accumulator volume generally concentrically about the outer surface of the guide.

6. The actuator of claim 5 and further comprising:
a dampening component mounted within the inner surface of the guide to dampen an accumulator response to movement of the rod inward relative to the cylinder housing with a constant cylinder volume.

7. The actuator of claim 1 wherein the actuator housing comprises a hydraulic actuator housing and wherein the fluid under pressure comprises hydraulic fluid.

8. An actuator, comprising:
a controllable by valve that is in fluid communication with an external hydraulic system and that is controllable to move between an open position and a closed position;
a cylinder housing;
a guide disposed within the cylinder housing, an external surface of the guide and the cylinder housing defining a cylinder volume and an accumulator volume, the cylinder volume being in fluid communication with the external hydraulic system when the controllable hydraulic valve is in the open position and maintain a constant amount of hydraulic fluid when the controllable hydraulic valve is in the closed position;
an accumulator piston, slidably disposed about the guide, within the cylinder housing and separating the cylinder volume from the accumulator volume; and
a rod, supported by an inner surface of the guide, for movement outward relative to the cylinder housing in response to fluid under pressure being introduced through the controllable hydraulic valve into the cylinder volume, wherein the accumulator piston is slidably mounted to reduce the accumulator volume when the rod moves inward relative to the cylinder housing with the controllable hydraulic valve being controlled to be in the closed position to maintain a constant cylinder volume.

9. The actuator of claim 8 wherein the accumulator volume is charged with a compressible medium and wherein the accumulator piston compresses the compressible medium as it reduces the accumulator volume.

10. The actuator of claim 9 and further comprising:
a dampening component mounted within the inner surface of the guide to dampen an accumulator response to movement of the rod inward relative to the cylinder housing with a constant cylinder volume.

11. The actuator of claim 10 wherein the dampening component comprises:
a restrictor that restricts flow of the fluid in the cylinder volume thereacross.

12. A row unit that performs an operation on a crop row, the row unit comprising:
a soil engaging element that engages soil to perform the operation;
a downforce actuator that applies a down force to the soil engaging element, the downforce actuator comprising:
a controllable hydraulic valve,
a rod;
a cylinder housing defining a cylinder volume with a port and an accumulator volume, the controllable hydraulic valve being controllable to move between an open position in which hydraulic fluid can move through the port between the cylinder volume and a hydraulic system and a closed position, in which hydraulic fluid does not move through the port, the cylinder housing movably supporting the rod for movement outward relative to the cylinder housing in response to fluid under pressure being introduced into the cylinder volume through the controllable hydraulic valve and the port; and
an accumulator piston, movably supported within the cylinder housing and separating the cylinder volume from the accumulator volume in the cylinder housing, the accumulator piston compressing a compressible medium in the accumulator volume in response to movement of the rod into the housing with the controllable hydraulic valve controlled to be in the closed position.

13. The row unit of claim 12 wherein the soil engaging element comprises:
an opener that generates a furrow in the soil to receive a seed;
a closer that closes the furrow; and
a set of gauge wheels that control a depth of the furrow and that firm sides of the furrow.

14. The row unit of claim 13 and further comprising:
a gauge wheel load sensor that senses a load on the set of gauge wheels and generates a sensor signal indicative of the sensed load, and wherein a control system receives the sensor signal and controls the fluid under pressure to the downforce actuator based on the sensor signal.

15. The row unit of claim 14 wherein the downforce actuator provides the downforce to a plurality of ganged row units.

16. The row unit of claim 14 wherein the cylinder housing comprises:
a guide that has an inner surface and an outer surface and supports the rod for movement along the inner surface, the guide supporting the accumulator piston for movement along the outer surface.

17. The row unit of claim 16 wherein the cylinder housing defines the accumulator volume generally concentrically about the outer surface of the guide, wherein the accumulator volume is charged with the compressible medium and wherein the accumulator piston moves to compress the compressible medium in the accumulator volume in response to movement of the rod into the cylinder housing with a constant amount of fluid under pressure in the cylinder volume.

18. The row unit of claim 17 wherein the downforce actuator further comprises:
a dampening component mounted within the inner surface of the guide to dampen an accumulator response to movement of the rod inward relative to the cylinder housing with a constant cylinder volume.

* * * * *

UNITED STATES PATENT AND TRADEMARK OFFICE
CERTIFICATE OF CORRECTION

PATENT NO. : 9,964,124 B2  
APPLICATION NO. : 14/843293  
DATED : May 8, 2018  
INVENTOR(S) : Randall A. Maro Page 1 of 1

It is certified that error appears in the above-identified patent and that said Letters Patent is hereby corrected as shown below:

In the Claims

Column 11, Claim 8, Line 10 delete "by" insert --hydraulic--

Signed and Sealed this  
Twenty-ninth Day of December, 2020

Andrei Iancu  
*Director of the United States Patent and Trademark Office*